June 14, 1949. C. E. EARLE ET AL Re. 23,120

COUPLING

Original Filed April 25, 1947

Inventors
Clarence E. Earle and
Carl A. Covington
By Raymond W. Holton
Attorney

Reissued June 14, 1949

Re. 23,120

UNITED STATES PATENT OFFICE 23,120

COUPLING

Clarence E. Earle, Washington, D. C., and
Carl A. Covington, Alexandria, Va.

Original No. 2,463,253, dated March 1, 1949, Serial No. 743,986, April 25, 1947. Application for reissue March 25, 1949, Serial No. 83,506

14 Claims. (Cl. 285—169)

Whereas snap couplings adapted for one hand assembly and disassembly have been proposed in the past, they have been characterized in general by an inordinate number of parts rendering their assembly difficult and their maintenance costly.

A continued need has existed for a coupling having few operating parts with which a fluid tight seal can be effected and maintained while permitting relative rotation of the joint members.

In accordance with the present invention it is sought to provide such a coupling comprising a joint member, a detent and a detent actuating sleeve carried by the member, a detent operator interposed between and normally projecting beyond the member and sleeve, and another joint member providing an abutment engageable with the operator when the members are coupled. The member carrying the detent and sleeve may be a socket member while that providing the abutment may assume the form of a plug member. The detent of the proposed invention is preferably normally released and advanced to a latching position as result of engagement between the abutment and detent operator. The operator is preferably biased towards its projecting position, the biasing means being at least partially overcome by engagement of the abutment with the operator so that the detent will be resiliently urged towards its securing position upon the attainment of registry between the detent and a cooperating recess provided by the second member. The sleeve is preferably provided with a cam secured thereto for engaging the detent, which cam may be of annular configuration and integral with the sleeve. The detent may assume the form of one, but preferably a plurality of radially displaceable balls received in a corresponding number of radial perforations provided through the wall of the detent carrying member. Means is also provided for biasing the sleeve towards a detent advancing position. The biasing means will preferably assume the form of a compression spring interposed between the detent bearing member and the operator and a second compression spring concentric therewith occupying a common chamber, and interposed between the sleeve and the operator. One of the members is provided with an annular groove for the reception of a sealing element, which may assume the form of a rubber or rubber like gasket of the type known as an O-ring, which is generally of toroidal shape for engagement with a cooperating portion of the other member.

Upon a coupling operation of the joint members, advancing movement of the detent will be restrained at the outset, the abutment bearing upon the operator to compress the springs seated thereon until the recess or annular groove assumes registry with the detent, whereupon the spring interposed between the operator and sleeve will urge the latter in a direction to advance the detent to a seating position and prevent retrograde movement of the detent until the members are uncoupled. During the coupling operation, the sealing gasket will be deformed to produce a fluid tight seal.

The assembly of the sleeve and operator upon the joint member supporting them is preferably effected by means of retainer rings, and where such rings are of the tension type, they may assume the form of stressed rubber annuli seated in a groove, the annuli having an internal diameter normally less than that of the groove and an effective external diameter greater than that of the abutment defined on the element to be retained.

Uncoupling operation is effected by merely shifting the sleeve in a direction towards the abutment bearing member to release the detent, whereupon the spring interposed between the other member and the detent operator will eject the abutment bearing member to an uncoupled position.

A more complete understanding of the invention will follow from a more detailed description in connection with the accompanying drawings wherein.

Figure 1:
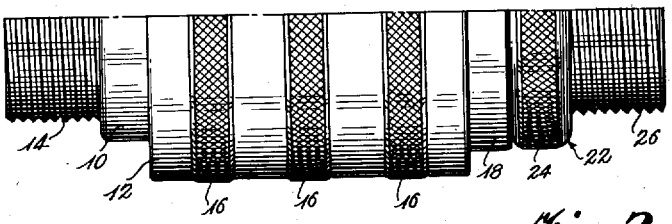
Fig. 1 is a fragmentary elevation of the members in coupled relationship.

The coupling comprises a socket member 10 supporting a reciprocable sleeve 12 and having external threads 14 provided at its free end. The sleeve may be provided with knurling 16 or other suitable gripping means to facilitate movement by an attendant. An annular detent operator 18 is interposed between the socket member 10 and sleeve 12 and projects outwardly therefrom for cooperation with an abutment 20 provided on a plug member 22 intended for insertion in the socket member. The plug member may likewise be provided with knurling 24 to facilitate engagement by an attendant and external threads 26 may be provided at its free end.

With reference to Figs. 2 to 5 inclusive, the socket member is provided with a suitable number of inwardly converging radial perforations 28, four having been indicated for convenience, for the reception of a corresponding number of detents or balls 30 of such a size as to project through the wall of the member without passing completely therethrough. The socket member is provided with an internal annular groove 32 for the reception of a sealing gasket 34 depicted as generally toroidal in shape and composed of rubber or rubber like material so as to be resiliently deformable under the pressure of a cooperating portion of the plug member to constitute a seal between the members. A peripheral shoulder 36 is provided externally of the socket member longitudinally intermediate its internal groove 32 and its radial perforations 28 to limit movement of the sleeve 12 in one direction. The plug receiving end 38 of the socket is externally reduced to define a shoulder 40 which serves as a bearing surface for a helical compression spring 42 embracing its reduced end 38.

The sleeve 12 is provided with an integral annular cam 44, terminated at one side by a radial shoulder 46 which cooperates with the peripheral shoulder 36 to limit movement of the sleeve in one direction, the other side of the cam terminating in a cylindrical surface 48 which engages and confines the balls under coupled conditions. The internal wall of the sleeve is counterbored to define a recess 50 for the receipt of one end of a helical compression spring 52 concentric with the compression spring 42 of smaller diameter though somewhat greater strength. Due to the formation of the recess 50, the sleeve is provided with a longitudinal flange or projection 54 which serves to maintain the adjacent ends of the springs in spaced relationship.

The opposite ends of these springs bear upon the internal end of the operator 18 being maintained in spaced relationship by a reduced longitudinal flange 56 formed on the operator. The operator is retained on the reduced end of the socket member by means of a stressed rubber annulus 58 of generally toroidal form received in an annular groove 60 provided near the end of the socket member. The operator is retained with respect to the sleeve by means of a segmental metallic ring 62 received in an internal groove 64 near the end of the sleeve.

The plug member 22 is provided with an inclined sealing surface 66 for engagement with the gasket 34 which surface intersects a slightly tapered external wall 68 which is received by a complementary surface 70 formed internally of the socket member. The tapered wall 68 extends to an annular groove 72 formed externally on the plug member to receive the balls 30 under coupled conditions. The radial portions 74 of this groove converge inwardly to produce a jamming action should there be any tendency towards relative longitudinal movement of the members when they are coupled.

To assemble the components of the socket member, the balls will first be positioned in their radial openings and temporarily held therein by means of a heavy grease, whereupon the sleeve 12 is applied over the end of the socket member to retain the balls during the completion of the assembly. The springs are then inserted between the sleeve and socket member, following which the operator is inserted and the retainer rings applied to their respective seats. At some suitable phase of the assembly, the sealing gasket 34 is positioned in its groove. The operation of the coupling will be clearly understood upon reference to Figs. 2 to 5 inclusive depicting some of the various stages of a coupling and uncoupling operation.

Figure 2:
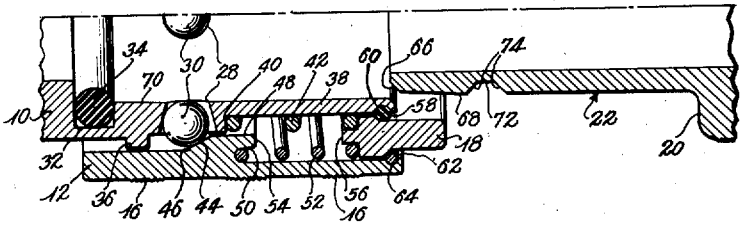
Fig. 2 is a fragmentary sectional elevation of the members in uncoupled condition.
Figure 3:
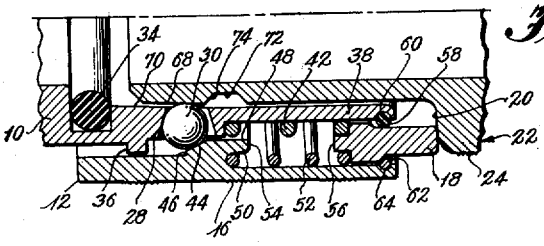
Fig. 3 is a fragmentary sectional elevation of the members in one of the positions assumed during a coupling operation.
Figure 4:
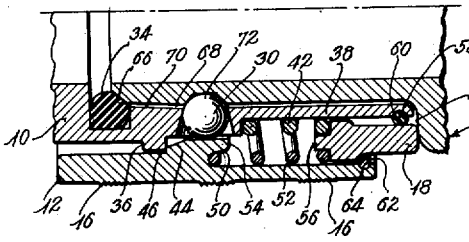
Fig. 4 is a fragmentary sectional elevation of the members in coupled relationship.
Figure 5:
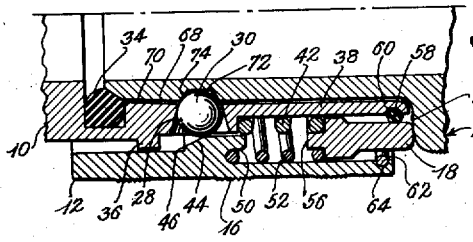
Fig. 5 is a fragmentary sectional elevation of the members during the primary stages of an uncoupling operation.

In Fig. 2 the components of the socket member are shown in their normal positions before the plug 22 is inserted. In Fig. 3 the plug has been partially inserted into the socket, the tapered wall 68 of the plug preventing inward movement of the balls despite the fact that the abutment 20 is bearing upon the operator 18 to compress the springs 42 and 52. Further movement of the plug into the socket results in additional compression of these springs so that when the groove 72 registers with the balls 30, the sleeve 12 will snap to the left under the action of the spring 52 causing the cam surface 44 to force the balls into the groove to be confined in that position by the cylindrical surface 48. The coupled condition of the members is depicted in Fig. 4 where it will be noted that the spring 42 is under compression and the operator 18 unseated or depressed with respect to its normal uncoupled position. Consequently, when the sleeve 12 is shifted to the right, the first portion of which movement has been illustrated in Fig. 5, as soon as the cam surface 44 permits the balls 30 to ride up on the inclined radial portion of the groove 74 to release the plug, the operator 18 will be projected by its spring 42 to bear against the abutment 20 to eject the plug sufficiently to move its detent receiving groove out of registry with the detent.

Thus, it will be seen that the coupling of the present invention is susceptible to and well adapted for one hand operation in both coupling and uncoupling movements, assuming of course, that the socket member 10 is relatively rigidly mounted at its threaded end.

Whereas only one form of the invention has been illustrated in the drawings, it will be clear to those skilled in the art as it has already occurred to the present inventors, how the invention can be applied in other structural forms, and accordingly, the invention should not be restricted to the example beyond the scope of the appended claims.

We claim:

1. A coupling comprising a joint member, a detent and a detent actuating sleeve carried by said member, a detent operator interposed between and projecting beyond said member and sleeve prior to assembly of said member with a second member, and a second joint member providing an abutment engageable with said operator when said members are coupled to actuate said detent.

2. A coupling comprising a joint member, a detent and a detent actuating sleeve carried by said member, a detent operator interposed between and projecting beyond said member and sleeve prior to assembly of said member with a second member, means biasing said operator towards its projecting position, and a second joint member providing an abutment engageable with said operator to overcome said biasing means and advance said detent when said members are coupled.

3. A coupling comprising a joint member, a detent and a detent actuating sleeve carried by said member, a cam secured to said sleeve for engagement with said detent, a detent operator interposed between and projecting beyond said member and sleeve prior to assembly of said member with a second member, and a second joint member providing an abutment engageable with said operator when said members are coupled to actuate said detent.

4. A coupling comprising a joint member, a detent and a detent actuating sleeve carried by said member, an annular cam integral with said sleeve for engagement with said detent, a detent operator interposed between and projecting beyond said member and sleeve prior to assembly of said member with a second member, and a second joint member providing an abutment engageable with said operator when said members are coupled to actuate said detent.

5. A coupling comprising a joint member, a plurality of radially displaceable balls constituting a detent and a detent actuating sleeve carried by said member, a detent operator interposed between and projecting beyond said member and sleeve prior to assembly of said member with a second member, and a second joint member providing an abutment engageable with said operator when said members are coupled to actuate said detent.

6. A coupling comprising a joint member, a detent and a detent actuating sleeve carried by said member, a detent operator interposed between and projecting beyond said member and sleeve prior to assembly of said member with a second member, means biasing said operator towards its projecting position and said sleeve towards said detent, and a second joint member providing an abutment engageable with said operator when said members are coupled to actuate said detent.

7. A coupling comprising a joint member, a detent and a detent actuating sleeve carried by said member, a detent operator interposed between and projecting beyond said member and sleeve prior to assembly of said member with a second member, a spring interposed between said member and operator, a spring interposed between said sleeve and operator, and a second joint member providing an abutment engageable with said operator when said members are coupled to actuate said detent.

8. A coupling comprising a joint member, a detent and a detent actuating sleeve carried by said member, a detent operator interposed between and projecting beyond said member and sleeve prior to assembly of said member with a second member, concentric compression springs interposed between said operator and said member and sleeve respectively, and a second joint member providing an abutment engageable with said operator when said members are coupled to actuate said detent.

9. A coupling comprising a joint member, a detent and a detent actuating sleeve carried by said member, a detent operator interposed between and projecting beyond said member and sleeve prior to assembly of said member with a second member, a second joint member having a detent receiving recess and providing an abutment in bearing relationship with said operator when said members are coupled to actuate said detent, and a sealing element for engaging said members.

10. A coupling comprising a joint member, a detent and a detent actuating sleeve carried by said member, a detent operator interposed between and projecting beyond said member and sleeve prior to assembly of said member with a second member, a second joint member having a detent receiving recess and providing an abutment engageable with said operator to advance said detent into said recess under conditions of registry when said members are coupled, said sleeve being movable towards said second member to release said detent and eject said second member.

11. A snap coupling comprising a joint member, a detent and a detent actuating sleeve carried by said member, a detent operator interposed between and projecting beyond said member and sleeve prior to assembly of said member with a second member, a spring interposed between said operator and sleeve, a second joint member having a detent receiving recess and providing an abutment engageable with said operator to compress said spring until said detent and recess register when said members are coupled.

12. A coupling comprising a joint member, a detent and a detent actuating sleeve carried by said member, a detent operator interposed between and projecting beyond said member and sleeve prior to assembly of said member with a second member, a spring interposed between said operator and member, and a second joint member having a detent receiving recess and providing an abutment engageable with said operator when said members are coupled to actuate said detent, said spring projecting said operator and ejecting said second member upon movement of said sleeve to release said detent.

13. A joint comprising a pair of members, one receiving the other for relative sliding movement, an abutment provided by one of said members, the other of said members containing an external annular groove, and a stressed rubber annulus seated in said groove to limit relative sliding movement between said members, said annulus having an internal diameter normally less than that of said groove and an effective external diameter greater than that of said abutment.

14. A joint comprising a pair of members, one receiving the other for relative sliding movement, an abutment provided by one of said members, the other of said members containing an external annular groove, and a stressed rubber toroid seated in said groove to limit relative sliding movement between said members, said toroid having an internal diameter normally less than that of said groove and an effective external diameter greater than that of said abutment.

CLARENCE E. EARLE.
CARL A. COVINGTON.

No references cited.